United States Patent
Vassilieff

(10) Patent No.: US 9,891,045 B2
(45) Date of Patent: Feb. 13, 2018

(54) METHOD FOR DETERMINING A PIVOTING ANGLE OF A WHEEL UNIT MOUNTED ONTO A SNAP-IN INFLATION VALVE

(75) Inventor: Youri Vassilieff, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 1183 days.

(21) Appl. No.: 13/976,626

(22) PCT Filed: Dec. 19, 2011

(86) PCT No.: PCT/EP2011/006595
§ 371 (c)(1),
(2), (4) Date: Aug. 1, 2013

(87) PCT Pub. No.: WO2012/089344
PCT Pub. Date: Jul. 5, 2012

(65) Prior Publication Data
US 2013/0304416 A1     Nov. 14, 2013

(30) Foreign Application Priority Data
Dec. 30, 2010  (FR) .................................... 10 05168

(51) Int. Cl.
*G01B 21/22* (2006.01)
*B60C 23/04* (2006.01)

(52) U.S. Cl.
CPC .......... *G01B 21/22* (2013.01); *B60C 23/0481* (2013.01); *B60C 23/0488* (2013.01); *B60C 23/0494* (2013.01)

(58) Field of Classification Search
USPC ....................................................... 702/151
See application file for complete search history.

(56) References Cited

U.S. PATENT DOCUMENTS 6,112,587 A      9/2000  Oldenettel
2003/0058118 A1*  3/2003  Wilson ................ B60C 23/0423
                                              340/679

(Continued)

FOREIGN PATENT DOCUMENTS

CN    101063620 A    10/2007
DE    197 34 323 A1    2/1999

(Continued)

OTHER PUBLICATIONS

International Search Report, dated Feb. 6, 2012, from corresponding PCT application.

(Continued)

*Primary Examiner* — Paul D Lee
(74) *Attorney, Agent, or Firm* — Young & Thompson

(57) ABSTRACT

A method for determining a pivoting angle ($\alpha$) of a wheel unit (12) mounted onto a snap-in inflation valve (10) includes the following three phases:
observation of a curve representing the effect of gravity on the radial acceleration $A_{mes}$ of a wheel of the vehicle on a sensing axis Y' which is related to the wheel unit and is not parallel to the axis of rotation of the wheel, by spectrum analysis of the gravity curve at a sampling frequency $F_s$ greater than an assumed rotation speed $\omega$ of the wheel,
deduction of the actual rotation speed $\omega$ of the wheel, and determination of the pivoting angle $\alpha$ according to the formula $$\cos\alpha = \frac{\overline{A_{mes}}}{\omega^2 \times R},$$

(Continued)

where ω is the actual angular speed deduced from the observation of the curve, $\overline{A_{mes}}$ is a mean value of the corrected radial acceleration, and R is a standardized radius of the wheel.

14 Claims, 2 Drawing Sheets

(56) References Cited

U.S. PATENT DOCUMENTS

| 2006/0152212 A1 | 7/2006 | Beranger et al. |
| 2006/0235641 A1 | 10/2006 | Fink et al. |
| 2008/0126006 A1 | 5/2008 | Bertrand |
| 2009/0144017 A1 | 6/2009 | Penot et al. |

FOREIGN PATENT DOCUMENTS

| DE | 199 21 413 C1 | 11/2000 |
| EP | 1 923 669 A1 | 5/2008 |
| EP | 2 065 229 A1 | 6/2009 |
| FR | 2 856 145 A1 | 12/2004 |
| WO | 2009/070065 A1 | 6/2009 |
| WO | 2010099877 A1 | 9/2010 |

OTHER PUBLICATIONS

Chinese Office Action dated Mar. 18, 2015 from corresponding Chinese application.

* cited by examiner

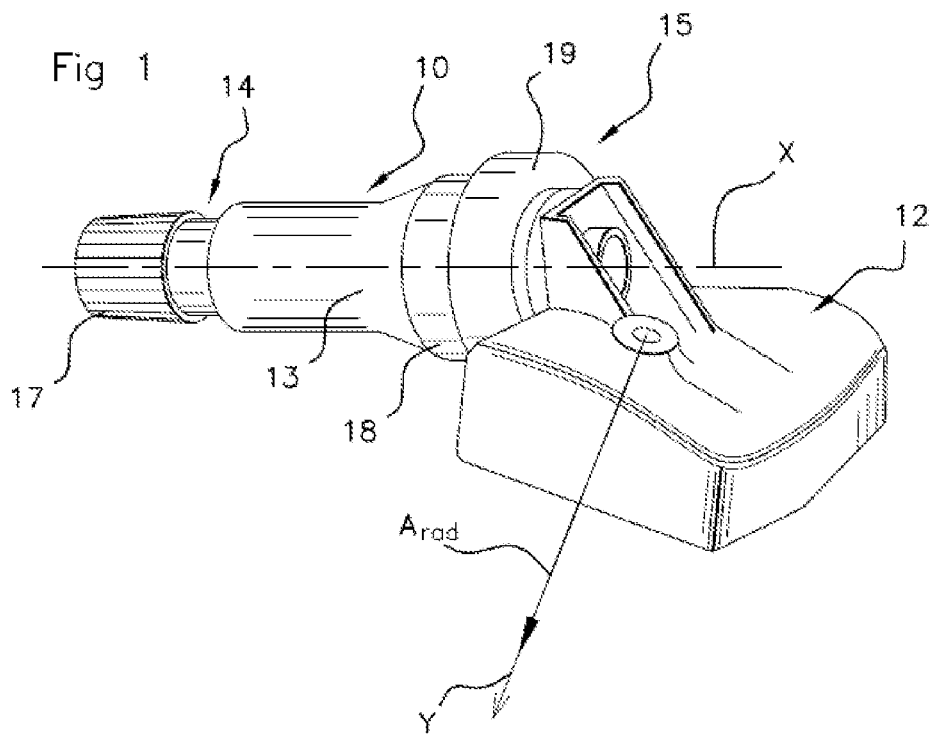
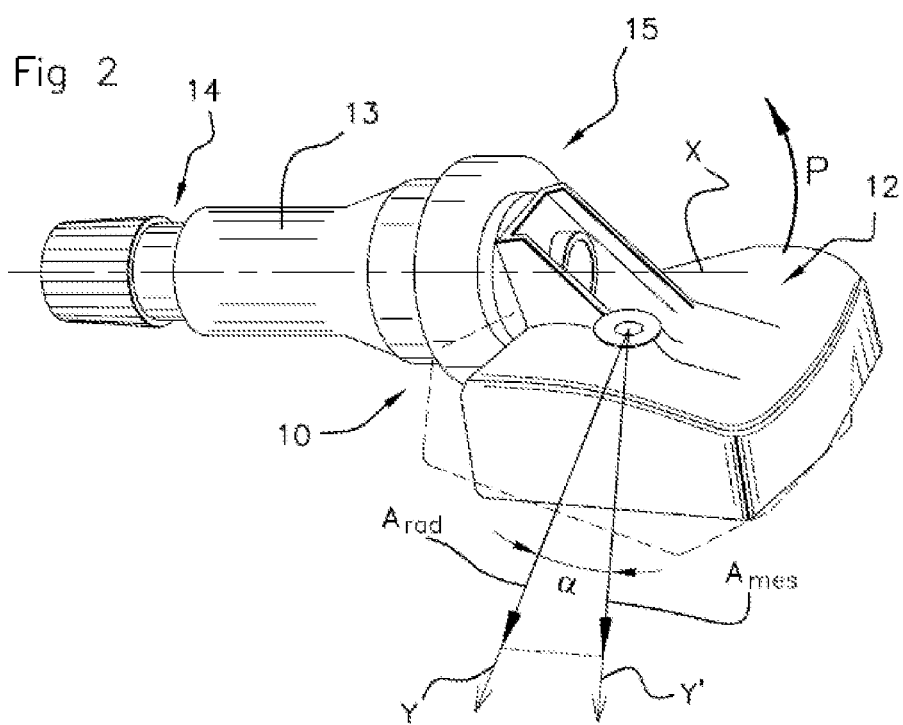

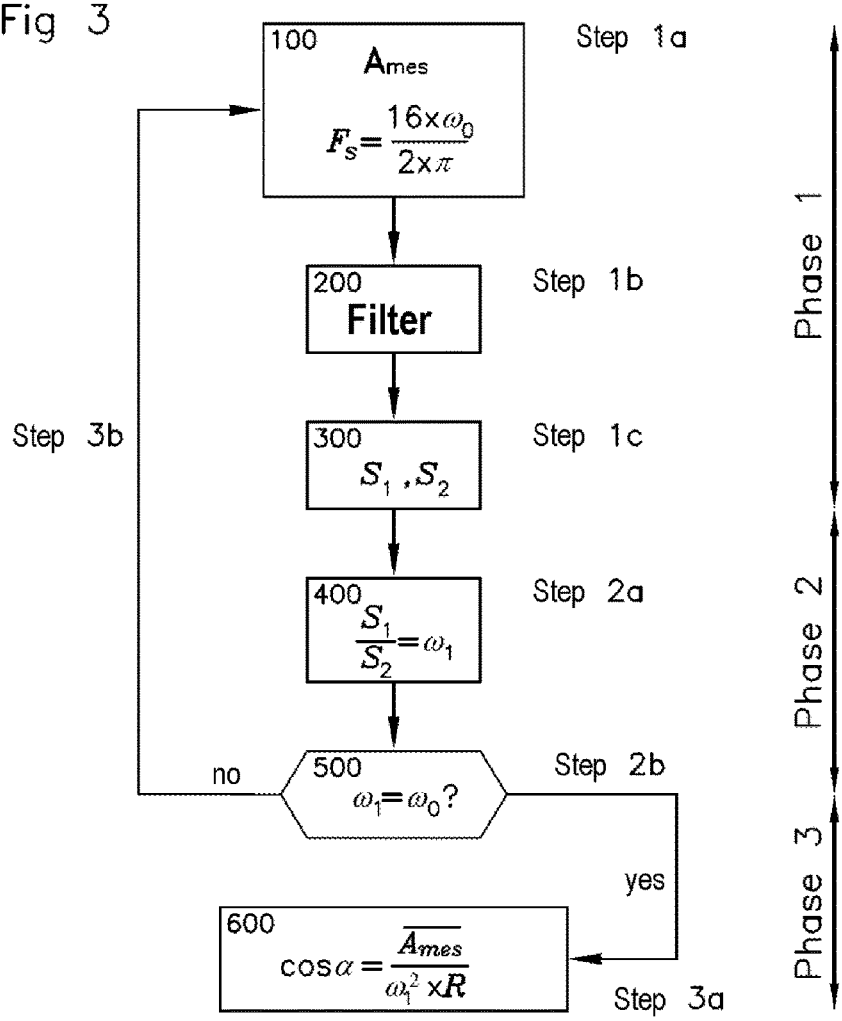
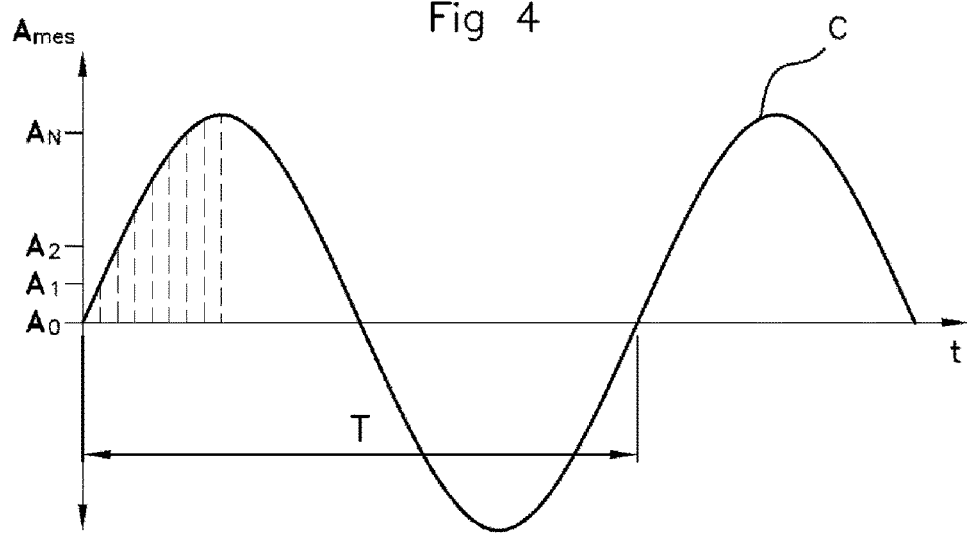

METHOD FOR DETERMINING A PIVOTING ANGLE OF A WHEEL UNIT MOUNTED ONTO A SNAP-IN INFLATION VALVE

BACKGROUND OF THE INVENTION

Field of the Invention

The present invention relates to a method of determining the pivoting angle of a wheel unit belonging to a tire pressure monitoring system. More particularly, this wheel unit is fixed to a snap-in inflation valve mounted on a motor vehicle.

Description of the Related Art

There is a known method of monitoring the pressure inside the tires of a vehicle during its movement. For this purpose, a wheel unit, containing, notably, a pressure measurement sensor, is placed inside the tire, and a central unit is placed in the vehicle. The wheel unit and the central unit interact with each other by wireless means, using radio frequency transceivers.

There are different ways of fastening wheel units to the rim of a vehicle. Some wheel units are fastened onto a metal inflation valve by screwing. Others are fastened onto a rubber snap-in inflation valve by press-fitting. Yet others are fastened to the rim inside the tire or onto the rubber of the tire itself.

BRIEF SUMMARY OF THE INVENTION

The present invention relates more particularly to snap-in inflation valves. These valves are fastened to the rim by forcible deformation of their constituent rubber when they are inserted into an opening provided for this purpose in the rim. These inflation valves (which are known in themselves) are adapted to enable the tire to be inflated. In the case of tire pressure monitoring systems, these valves are also adapted to support a wheel unit containing, notably, at least temperature and pressure sensors, an accelerometer (and/or an impact sensor), a microprocessor, a memory, a battery, an RF (radio frequency) transmission device, and an LF (low frequency) receiving device.

Wheel units of this type, fixed to snap-in valves, are generally found to be satisfactory. However, the weight of these wheel units, fastened to the end of the snap-in valve, tends to cause the wheel unit to pivot about the axis of the opening in the rim when the vehicle moves at high speed. The geometric constraints make this behavior inevitable. This is because the valves cannot be mounted in a stable position at the outset. This does not cause any leakage of air toward the outside of the tire, but the pivoting causes the measurement axis of the accelerometer contained in the wheel unit to move out of alignment with the radial direction of the tire. The wheel units are initially positioned in such a way that the accelerometer (or the impact sensor) contained in them can measure the radial acceleration of the tire. Consequently, the measurements made by the accelerometer (and/or the impact sensor) when the wheel unit has pivoted are no longer the direct measurements of the radial acceleration of the wheel, but are only measurements of the projection of this radial acceleration on the measurement axis. In some cases (if the wheel unit pivots through 90° with respect to its initial position) the accelerometer even becomes incapable of measuring the acceleration, and can no longer detect whether the vehicle is moving or not.

Furthermore, when the measurements of acceleration that have been made are used to determine the angular speed of the wheel, the determination of this rotation speed is erroneous. This is because it is essential to know the pivoting angle assumed by the wheel unit in order to measure this speed. At the present date there is no means of measuring this pivoting angle. Moreover, this pivoting angle is variable (even though it tends to assume a stable value after a certain period of travel, this value is not reached immediately). It is therefore necessary to be able to measure this pivoting angle whenever the vehicle starts to move, or when sudden acceleration occurs. Indeed, it is sudden acceleration of this type that is liable to cause the wheel unit to pivot. The problem remains that it is impossible to predict the exact moment when the wheel unit will pivot, or the extent of its pivoting. Everything depends on the acceleration to which the wheel unit is subjected, but also on the tightness of the snap-in valve body in the rim opening and the quality and quantity of lubricant that may be used on the valve body when it is placed in the opening in the rim.

Because of the pivoting of the wheel unit, if the latter is required to transmit radio frequency messages when it is at one or more specified angular positions, it is no longer possible to ensure that the transmissions actually take place at the predetermined positions. This is because a knowledge of the rotation speed of the wheel is essential in order to determine the positions of transmission with fixed angles. However, when the wheel unit pivots about the axis of the rim opening, this angular speed cannot be determined with the necessary accuracy. This transmission of the wheel unit with fixed angles is used more particularly to locate the wheel units on the vehicle by a method known as location on synchronization (LocSync). Methods of this type are described more particularly in patents DE 197 34 323 and DE 199 21 413.

In order to overcome this drawback, the mounting of wheel units fastened to snap-in valves is avoided in vehicles likely to move at high speed. Consequently, metal valves, which are much more expensive to manufacture, are used in these vehicles.

Another way of overcoming this drawback is to provide the wheel unit with fins or means preventing it from pivoting on itself in the rim opening, by locking it with respect to rotation. However, all these additional locking means are expensive and difficult to produce. Furthermore, when the tire is removed it is very likely that these locking means will be broken, making it necessary to change the wheel unit of the pressure monitoring system at every tire change.

The object of the present invention is to overcome all these drawbacks by proposing a method for determining the pivoting angle of a wheel unit mounted onto a snap-in inflation valve.

According to the invention, this method comprises the following phases:

Phase 1:
observation of a curve representing the effect of gravity on the radial acceleration $A_{mes}$ of a vehicle wheel on a sensing axis which is related to the wheel unit and is not parallel to the axis of rotation of the wheel, by spectrum analysis of the gravity curve at a sampling frequency $F_s$ greater than the assumed rotation speed $\omega$ of the wheel, Phase 2:
deduction of an actual angular speed $\omega$ of the wheel, and Phase 3:
determination of the pivoting angle $\alpha$ according to the formula $$\cos\alpha = \frac{\overline{A_{mes}}}{\omega^2 \times R},$$

where ω is the actual angular speed deduced from the observation of the curve, $\overline{A_{mes}}$ is a mean value of measured radial acceleration, and R is a standardized radius of the wheel.

Thus the spectrum analysis of the gravity curve can be used to determine the rotation speed of the wheel and to deduce the pivoting angle from this by a relatively simple formula.

Advantageously, the spectrum analysis is what is known as "on the fly" spectrum analysis of the curve C, which is assumed to be sinusoidal, by identification (in other words, by assuming that the curves are identical) between a discrete sampling of the acceleration value and a formal expression of said curve, with continuous adaptation of the sampling frequency. This adaptation is carried out in such a way that the identification between the sampled curve and the formal curve remains possible (in other words, by acting in such a way that the error remains small and a convergence is obtained toward the actual rotation speed of the wheel).

In fact, the principle of calculation used here is based on the identification between the discrete integration of the signal (of the sum of samples type) and the expression of the continuous integration of the formula that the signal is believed to fit. The projection of gravity on the axis of the accelerometer is assumed to fit a sinusoid during constant rotation (at constant vehicle speed). The formal integration of a sinusoid reveals its pulsation ω. This pulsation ω then has to be isolated, by determining surface area ratios (for example).

However, this identification is only valid if the sampling frequency remains high relative to ω. This led to the idea of continuously updating this sampling frequency as a function of each value ω obtained.

This adaptive feedback provides convergence of the algorithm, while also limiting the approximation error generated by the identification. This frequency adaptation also enables small microcontrollers, such as those used in tire pressure sensors, to host the algorithm. If the frequency were too low, convergence would not be achieved, whereas if it were too high, the dynamics would no longer be sufficient: excessively small increments of time or signal would result in excessively large discretization errors.

More particularly, the present method comprises the following steps:

1a) measuring a radial acceleration $A_{mes}$ of the wheel at a predetermined sampling frequency $$F_S = \frac{16 \times \omega_0}{2 \times \pi},$$

where $\omega_0$ is the assumed rotation speed of the wheel, 1b) filtering and determining a first sinusoidal curve representing the variations of the radial acceleration sampled in step 1a), as a function of the rotation of the wheel, by eliminating noise and centering this curve on the origin, 1c) determining a surface area $S_1$ of this first sinusoidal curve and a surface area $S_2$ of a second sinusoidal curve representing the integral of the first sinusoidal curve, 2a) determining a rotation speed $\omega_1$ of the wheel by finding the ratio of these two surface areas according to the formula $$\frac{S_1}{S_2} = \omega_1,$$

2b) verifying that the rotation speed $\omega_1$ determined in this way does in fact match the sampling frequency $F_s$ of step 1a), and:

3a) if this is the case, determining the pivoting angle α after determination of a mean value of the radial acceleration $\overline{A_{mes}}$ according to the relation:

$$\cos\alpha = \frac{\overline{A_{mes}}}{\omega_1^2 \times R}$$

where
$\overline{A_{mes}}$ is the mean value of the radial acceleration, $\omega_1$ is the actual rotation speed of the wheel determined in step 2a, and R is a standardized radius of the wheel, or 3b) if this is not the case, repeating steps 1a) to 2b).

Thus the invention can be used to determine the rotation speed ω of the wheel independently of the pivoting angle of the wheel unit. This determination enables the acceleration measurements to be made subsequently at a suitable sampling frequency and thus allows the angle α to be determined by applying the formula $$\cos\alpha = \frac{\overline{A_{mes}}}{\omega_1^2 \times R}.$$

It should also be noted that the noise associated with the acceleration measurements at the sampling frequency $F_s$ can be centered and eliminated by using a Butterworth bandpass filter.

The ratio of the surface areas of the first sinusoidal curve and the second sinusoidal curve can be used to determine the rotation speed ω directly, one of these two curves being deduced from the other. This ratio of the surface areas is in fact equal to the ratio of the integral of the first sinusoidal curve to the double integral of the same curve.

Thus the invention can be used to determine (in a relatively simple way and especially without the need for a high-powered computer processor) the pivoting angle of the wheel unit with respect to its initial position.

Advantageously, the present invention is used solely when the vehicle has moved previously at a sufficient speed to cause a radial acceleration of 200 g or more which is liable to cause the wheel unit to rotate with respect to the axis of the rim opening.

The mean value of radial acceleration required to determine the pivoting angle α is determined only if the vehicle is moving at a steady speed between 50 and 130 km/h. Consequently, the pivoting angle is determined only at the appropriate time, rather than continuously, thus economizing on the use of the battery of the wheel unit. Clearly, if the energy economy is not required, this determination of the pivoting angle can be carried out periodically or continuously.

The determination of the pivoting angle of the wheel unit thus enables the wheel units of the vehicle to be located while allowing the wheel unit to transmit messages at fixed angles toward the central unit associated with the wheel unit.

Also advantageously, the invention enables any vehicle to be equipped with snap-in inflation valves (with their wheel units fitted to them) regardless of the speed at which the vehicle is capable of moving. This enables the cost of the tire pressure monitoring system to be reduced.

BRIEF DESCRIPTION OF THE DRAWINGS

Other objects, advantages and characteristics of the invention will also be made clear by the following description, provided by way of non-limiting example with reference to the attached drawings, in which:

FIG. 1 is a schematic view showing a wheel unit mounted on a snap-in inflation valve in the correct operating position, FIG. 2 is a schematic view showing a a snap-in valve associated with a wheel unit which has pivoted about the axis of the rim opening, FIG. 3 is a diagram showing the various steps of the method according to the invention, and FIG. 4 is a schematic view showing the variations of the radial acceleration of the wheel as a function of time.

DETAILED DESCRIPTION OF THE PREFERRED EMBODIMENTS

In the embodiment shown in FIGS. 1 and 2, an inflation valve 10 of what is known as the snap-in type is associated with a wheel unit 12. In a known manner which is not described in detail here, this inflation valve is designed to be placed in a rim (not shown) of a vehicle wheel (not shown) so as to allow the inflation and/or deflation of a tire (not shown) associated with this rim.

The inflation valve 10 is made of a resilient material such as rubber, and has a generally cylindrical body 13 having two ends, referred to as the outer end 14 and the inner end 15.

The inner end 15 (intended to be positioned inside the tire) has a head 19 onto which the wheel unit 12 is fastened. The wheel unit mounted in this way is fixed to the inflation valve 10 with respect to rotation.

The outer end 14 of the valve (intended to be accessible from outside the tire) carries a cap 17 for sealing an inflation passage (of a known type, not shown) running from one end of the body of the inflation valve to the other.

The snap-in valve is placed in the rim opening in a known way, by force-fitting the valve body into the rim opening. The rubber forming the body of the inflation valve is adapted to stretch when it passes into the rim opening (in a known way) and to return to its initial shape when the perimeter of the rim opening is fitted into a groove 18 provided between the body of the valve and its inner end 15. When positioned in this way, the inflation valve allows the tire to be inflated and/or deflated (after the removal of its cap 17). Obviously, a one-way valve system (of a known type, not shown) prevents any leakage of air toward the outside of the tire.

It should be noted that, in order to facilitate the positioning of the valve 10 in the rim opening, the valve body is very commonly (but not necessarily) lubricated before being positioned.

The wheel unit 12 is a casing of generally parallelepipedal shape containing a plurality of electronic components. Thus this wheel unit includes at least:
  temperature and pressure sensors,
  an accelerometer (and/or an impact sensor),
  a microprocessor,
  a memory,
  a battery,
  an RF (radio frequency) transmitter device, and
  an LF (low frequency) receiver device.

None of these elements is illustrated because they are of known types, and their illustration is not essential for an understanding of the present invention.

The wheel unit is intended to monitor at least the pressure and temperature within the tire and to transmit an alert message toward a central unit (not shown) mounted in the vehicle, to warn the driver of any anomalies detected in a tire of the vehicle.

The central unit and the wheel unit form a tire pressure monitoring system of a known type.

The axis of the rim opening in which the valve is mounted is identified by an X in the drawings.

When the wheel on which the wheel unit is mounted is caused to rotate at high speed (thus subjecting the wheel to an acceleration of about 200 g or more), the weight of the wheel unit causes the inflation valve to rotate about the axis X. In fact, the valve does not generally perform a number of revolutions, but pivots about the axis X before becoming locked in a stable position. It has been found that the pivoting of the wheel unit may take place in either a clockwise or an anticlockwise direction. Furthermore, the pivoting angle is not strictly defined, since each wheel unit may reach its own stable position.

However, as shown in FIG. 1, the accelerometer mounted in the wheel unit has a measurement axis Y which enables it, when the wheel unit is initially put in position (without pivoting, as shown in FIG. 1), to measure the radial acceleration $A_{rad}$ of the wheel directly.

When the wheel unit pivots about the axis X (FIG. 2) in the direction of the arrow P (for example), then the accelerometer mounted in this wheel unit pivots with it and the new direction of measurement Y' of the accelerometer is no longer the radial direction Y of the wheel, but is a direction deviating therefrom by an angle α. Consequently, the measurement of the acceleration $A_{mes}$ on the axis Y' (due to the pivoting of the wheel unit through an angle α) is only the projection of the radial acceleration on the axis Y', rather than the direct measurement of the radial acceleration. The measurement that is made must therefore be corrected to allow for the pivoting. However, in order to correct it, the value of the pivoting angle α must be known.

At the present time, no method exists for determining this angle in an automatic way. The present invention proposes a solution for the automatic determination of this angle α.

The method of determining the pivoting angle is used only if the vehicle is moving at a steady speed between 50 and 130 km/h without any significant change in speed in the period when the measurement is being made (typically four revolutions of a wheel). This enables the pivoting angle to be determined only when this angle is stable in one position; otherwise the determination would be of no value.

The method of determining the pivoting angle α is also only used if the vehicle has been previously subjected to acceleration forces in excess of 200 g. This is the type of acceleration that is liable to cause the wheel unit to pivot about the axis X of the rim opening. If the vehicle has not been subjected to this type of acceleration, there is no point in determining the pivoting angle, since this angle will probably not have changed since the last determination.

According to the invention, the method for determining the pivoting angle (α) of a wheel unit mounted onto a snap-in inflation valve mounted on a motor vehicle wheel having a diameter R includes three main phases (FIG. 3).

The first phase consists in the observation of the curve C representing the effect of gravity on the radial acceleration $A_{mes}$ of a wheel of the vehicle on a sensing axis Y' which is related to the wheel unit and is not parallel to the axis of rotation of the wheel, by spectrum analysis of the gravity curve at a sampling frequency $F_s$ greater than the assumed rotation speed ω of the wheel. For this purpose (see FIG. 3):

Step 1a (100):

The acceleration of the wheel is measured at a predetermined sampling frequency $$F_s = \frac{16 \times \omega_0}{2 \times \pi}.$$

In this formula, $\omega_0$ is an (assumed) initial rotation speed of the wheel. This initial rotation speed is not the actual speed (with rare exceptions). More precisely, the measured radial acceleration is $A_{mes}$. This value is therefore the projection of the actual radial acceleration on the axis Y'. This measurement is made at a sampling frequency Fs (which is found to be greater than the assumed initial rotation speed of the wheel $\omega_0$). The wheel rotation frequency is expected to lie within the range from 3 to 30 Hz. The initial sampling frequency $F_s$ is therefore preferably in the range from 3×16 to 30×16 Hz. The radial acceleration is preferably measured sixteen times per period (i.e. per wheel revolution). Consequently, applying the formula $$F_s = \frac{16 \times \omega_0}{2 \times \pi},$$

if the sampling frequency is fixed, this also fixes a first value $\omega_0$ as the assumed initial rotation speed of the wheel.

Step 1b (200):

The acceleration measurements $A_{mes}$ are then filtered, and a first sinusoidal curve C (FIG. 4) is determined, representing the variations in measured acceleration (due to gravity) sampled in step 1a), as a function of time (t). The noise is eliminated and this curve is centered on the origin. To eliminate the noise and center the curve, use is made, notably, of a Butterworth filter (or a bandpass filter). This gives us the curve C, whose equation is of the type (a sin $\omega_0 t+\alpha$), and which is shown in FIG. 4. The period T of this sinusoidal curve is equal to one wheel revolution.

Step 1c (300):

The surface area $S_1$ of this first sinusoidal curve C is then determined, and the surface area $S_2$ of a second sinusoidal curve representing the integral of the first sinusoidal curve is also determined.

Thus we have:

$$S_1 = \int |a \sin(\omega_0 t + \alpha)|$$

where a is a correction factor, $\omega_0$ is the assumed initial rotation speed of the wheel, t is the time and α is the pivoting angle.

$S_2$ is the surface area of the first curve C. In other words, it is the double integral of the curve C.

Thus we have:

$$S_2 = \int \frac{1}{\omega} |a \cos(\omega t + \alpha)|$$

The second phase of the method according to the invention consists in calculating the actual angular speed $\omega_1$ of the wheel. For this purpose, the following steps are executed:

Step 2a (400):

The actual rotation speed $\omega_1$ of the wheel is then determined by finding the ratio of these two surface areas according to the formula $$\frac{S_1}{S_{21}} \approx \omega_1,$$

provided that the integral is taken on a whole number of periods, an integration time equal to the period corresponding to $\omega_0$ being advantageously used, In fact, $$\frac{S_1}{S_2} = \frac{\int |a \sin(\omega_0 t + \alpha)|}{\int \frac{1}{\omega} |a \cos(\omega_0 t + \alpha|} \cong \omega_1$$

Thus we can find a value for the rotation speed of the wheel, $\omega^1$, which is independent of the pivoting angle α.

Step 2b (500):

The actual rotation speed $\omega_1$ calculated from the acceleration measurements made in step 1a) is compared with the assumed initial rotation speed $\omega_0$ fixed by default.

The third phase of the method according to the invention consists in the determination of the pivoting angle α.

For this purpose, the following steps are executed:

Step 3a (600):

If the two values ($\omega_0$, $\omega_1$) are identical (in other words, if the actual value of the rotation speed of the wheel has been found), the angle α is then determined according to the following formula:

$$\cos\alpha = \frac{\overline{A_{mes}}}{\omega_1^2 \times R},$$

where $\overline{A_{mes}}$ is the mean value of the measured radial acceleration, $\omega_1$ is the rotation speed of the wheel determined in step 2b), and R is a standardized radius of this wheel. This standardized mean radius is fixed arbitrarily at a value of 40.64 cm (i.e. 16 inches).

The mean value of the radial acceleration $\overline{A_{mes}}$ can be determined by calculating the mean of all the measurements made in the course of the determination of $\omega_1$. It is particularly advisable to verify at this time the stability of this mean acceleration during the preceding four to five wheel revolutions, by checking the minimum and maximum values. Thus it will remain possible to invalidate the result if the expected stability has not been achieved (it depends on the driver's behavior, in terms of braking for example).

It is also possible to determine the mean value of the radial acceleration by measuring the radial acceleration four times per wheel revolution during four to five consecutive wheel revolutions.

When cos α is known, the value of the angle α is deduced from it.

Step 3b (500):

If it has been found in step 2b) (500) that the rotation speeds ($\omega_0$, $\omega_1$) are different from one another, steps 1a) to 2b) are restarted, using $\omega_1$ as the new initial rotation speed.

By restarting this cycle of determining the rotation speed $\omega_1$ several times, we finally converge toward the actual rotation speed of the wheel.

It should be noted that the sampling frequency $F_s$ is determined iteratively by executing steps 1a) to 2b) in a loop until this frequency $F_s$ is equal to the rotation speed calculated in step 2a) of the preceding cycle.

Since the pivoting angle is known, the wheel unit can measure exactly the radial acceleration of the wheel on which it is mounted by correcting the measured acceleration values.

This knowledge of the actual radial acceleration makes it possible, for example, to arrange for the wheel unit to transmit messages toward the central unit while conforming to fixed transmission angles, or to discover automatically which wheel/sensor assemblies are mounted on the vehicle by correlation between the wheel speed and the vehicle speed.

Thus the method according to the invention makes it possible, by successive iterations, to determine the actual speed $\omega_1$ of the wheel, and then the pivoting angle $\alpha$.

The method for determining the pivoting angle ($\alpha$) of a wheel unit mounted onto a snap-in inflation valve 10 therefore includes the following three main phases:

Phase 1: observation of the curve C representing the effect of gravity on the radial acceleration $A_{mes}$ of a wheel of the vehicle on a sensing axis Y' which is related to the wheel unit and is not parallel to the axis of rotation of the wheel, by spectrum analysis of the gravity curve at a sampling frequency $F_s$ greater than an assumed rotation speed $\omega$ of the wheel, Phase 2: deduction of the actual rotation speed $\omega_1$ of the wheel, and Phase 3: determination of the pivoting angle $\alpha$ according to the formula:

$$\cos\alpha = \frac{\overline{A_{mes}}}{\omega_1^2 \times R}$$

Clearly, the present invention is not limited to the embodiment described and illustrated in FIGS. 1 to 4. In particular, the spectrum analysis means used to observe the curve C may be different from that described, without departure from the scope of the present invention.

The invention claimed is:

1. A method for determining a pivoting angle ($\alpha$) of a wheel unit (12) mounted onto a snap-in inflation valve (10), said valve being placed on a wheel of a motor vehicle, said method including the following:
  with an inner end (15) of the inflation valve (10) positioned on a rim opening of the wheel and with the wheel unit (12) fastened to a head (19) of the inflation valve (10) so that the wheel unit (12) is mounted fixed to the inflation valve (10) with respect to rotation, rotating the wheel so that a pivoting angle of a wheel unit occurs while the wheel is rotating,
  wherein the wheel unit has a measurement axis (Y) for measuring acceleration that allows the wheel unit, in an initial, non-pivoting position, to directly measure a radial acceleration (Arad) of the wheel,
  wherein during rotation of the wheel when the wheel unit pivots about the rotation axis (X) in a first direction (P), the measurement axis (Y) is displaced from the initial, measurement position by a pivoting angle $\alpha$ to a new position corresponding to a sensing axis (Y'), wherein when the wheel unit pivots about the rotation axis (X), the sensing axis (Y') is non-parallel to an axis of rotation of the wheel,
  the wheel unit pivots from the measurement axis (Y) to the sensing axis (Y') that deviates from the measurement axis (Y) by the pivoting angle $\alpha$ and measures a radial acceleration ($A_{mes}$) on the sensing axis (Y'),
  wherein, the method further includes the following phases:
  Phase 1:
    with the wheel pivoted and in rotation, measuring the radial accelerations (Ames) on the sensing axis (Y'),
    observation of a gravity curve C representing the effect of gravity on the radial acceleration ($A_{mes}$) of a wheel of the vehicle on the sensing axis (Y'), by performing spectrum analysis of the gravity curve at a sampling frequency $F_s$ greater than an assumed rotation speed $\omega_0$ of the wheel,
  Phase 2:
  deduction of an actual rotation speed $\omega$ of the wheel, where $\omega$ is the actual angular speed deduced from the observation of the gravity curve, and
  Phase 3:
  determination of the pivoting angle $\alpha$ according to the formula $$\cos\alpha = \frac{\overline{A_{mes}}}{\omega^2 \times R},$$

where $A_{mes}$ is a mean value of the measured radial accelerations, and R is a standardized radius of the wheel.

2. The method as claimed in claim 1, wherein in the spectrum analysis the curve C is assumed to be sinusoidal, and the spectrum analysis includes an identification between a discrete sampling of the acceleration value and a sinusoidal expression of said curve, with changing of the sampling frequency to provide convergence towards the actual rotation speed $\omega$ of the wheel.

3. The method for determining a pivoting angle as claimed in claim 2, further comprising the following steps:
  1a) measuring a radial acceleration $A_{mes}$ of the wheel at a predetermined sampling frequency $$F_s = \frac{16 \times \omega_0}{2 \times \pi},$$

where $\omega_0$ is the assumed rotation speed of the wheel,
  1b) filtering and determining a first sinusoidal curve C representing the variations of the radial acceleration sampled in step 1a), as a function of the rotation of the wheel, by eliminating noise and centering this curve on the origin,
  1c) determining a surface area $S_1$ of this first sinusoidal curve C and a surface area $S_2$ of a second sinusoidal curve representing the integral of the first sinusoidal curve, 2a) determining a rotation speed $\omega_1$ of the wheel by finding the ratio of these two surface areas according to the formula $$\frac{S_1}{S_2} = \omega_1,$$

2b) verifying that the determined rotation speed $\omega_1$ does match the sampling frequency $F_s$ of step 1a), and:

3a) when the determined rotation speed $\omega_1$ is verified to match the sampling frequency $F_s$ of step 1a), determining the pivoting angle $\alpha$ after determination of a mean value of the radial acceleration $\overline{A_{mes}}$ according to the relation:

$$\cos\alpha = \frac{\overline{A_{mes}}}{\omega_1^2 \times R}$$

where $\overline{A_{mes}}$ is the mean value of the radial acceleration, $\omega_1$ is the actual rotation speed of the wheel determined in step 2a, and R is a standardized radius of the wheel, and 3b) if this is not the case, repeating steps 1a) to 2b).

4. The method for determining a pivoting angle as claimed in claim 1, further comprising the following steps:

1a) measuring a radial acceleration $A_{mes}$ of the wheel at a predetermined sampling frequency $$F_s = \frac{16 \times \omega_0}{2 \times \pi},$$

where $\omega_0$ is the assumed rotation speed of the wheel, 1b) filtering and determining a first sinusoidal curve C representing the variations of the radial acceleration sampled in step 1a), as a function of the rotation of the wheel, by eliminating noise and centering this curve on the origin, 1c) determining a surface area $S_1$ of this first sinusoidal curve C and a surface area $S_2$ of a second sinusoidal curve representing the integral of the first sinusoidal curve, 2a) determining a rotation speed $\omega_1$ of the wheel by finding the ratio of these two surface areas according to the formula $$\frac{S_1}{S_2} = \omega_1,$$

2b) verifying whether the determined rotation speed $\omega_1$ does match the sampling frequency $F_s$ of step 1a), and:

3a) when the determined rotation speed $\omega_1$ is verified to match the sampling frequency $F_s$ of step 1a), determining the pivoting angle $\alpha$ after determination of a mean value of the radial acceleration $\overline{A_{mes}}$ according to the relation:

$$\cos\alpha = \frac{\overline{A_{mes}}}{\omega^2 \times R}$$

where $A_{mes}$ is the mean value of the radial acceleration, $\omega_1$ is the actual rotation speed of the wheel determined in step 2a, and R is a standardized radius of the wheel, and 3b) when the determined rotation speed $\omega_1$ is not verified to match the sampling frequency $F_s$ of step 1a), changing the sampling frequency $F_s$ and repeating steps 1a) to 2b).

5. The method as claimed in claim 4, wherein the sampling frequency $F_s$ is changed iteratively by executing steps 1a) to 2b) in a loop until the frequency $F_s$ is equal to the rotation speed calculated in step 2a) of the preceding cycle.

6. The method as claimed in claim 4, wherein step 1b) is executed with the aid of a bandpass filter.

7. The method as claimed in claim 6, characterized in that the bandpass filter is a Butterworth filter.

8. The method as claimed in claim 4, wherein, in step 3a), the mean value of the radial acceleration is determined by measuring the radial acceleration four times per wheel revolution during four to five consecutive wheel revolutions.

9. The method as claimed in claim 1, wherein the initial sampling frequency $F_s$ is within the range from 3×16 to 30×16 Hz.

10. The method as claimed in claim 1, wherein the sampling frequency $F_s$ is chosen in such a way that at least sixteen acceleration measurements are made in each period.

11. The method as claimed in claim 1, wherein the method is performed when the vehicle is moving at a steady speed between 50 and 130 km/h without any significant change in speed in the period when the measurement of the radial acceleration (Ames) on the sensing axis (Y'), is being made.

12. The method as claimed in claim 1, wherein the pivoting angle $\alpha$ is calculated when the wheel has previously been subjected to an acceleration of 200 g or more.

13. The method as claimed in claim 1, wherein the diameter R of the wheel is standardized to 40.64 cm (16 inches).

14. The method as claimed in claim 1, wherein the wheel unit is comprised of:
temperature and pressure sensors,
an accelerometer,
a microprocessor,
a memory,
a battery,
an RF (radio frequency) transmitter device, and
an LF (low frequency) receiver device, and
the accelerometer is used in measuring the radial acceleration (Ames) on the sensing axis (Y').

* * * * *